April 5, 1927. 1,623,834
J. H. GILDERSLEEVE
DEMOUNTABLE INTERLOCKING RIM FOR VEHICLE TIRES
Filed Aug. 15, 1924. 2 Sheets-Sheet 1
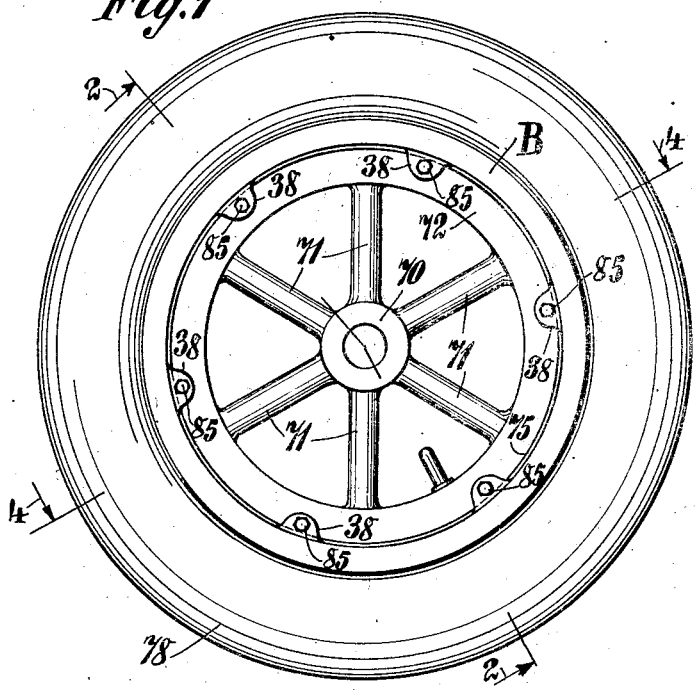
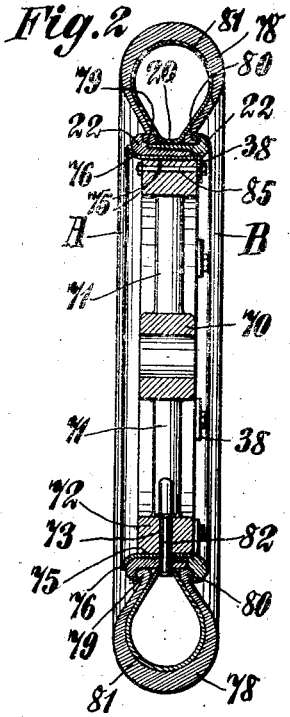
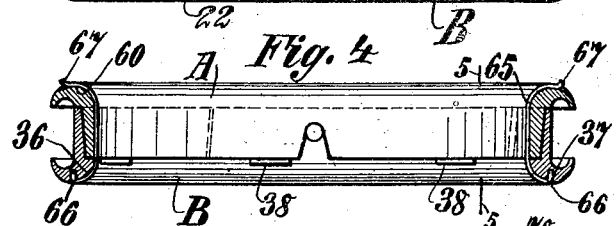
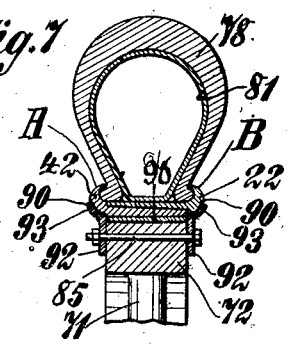
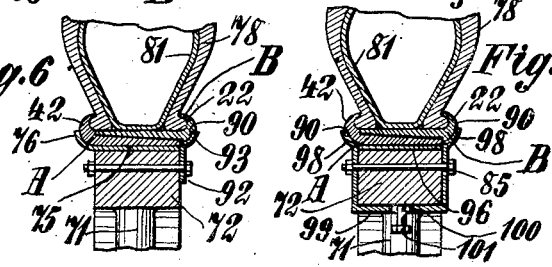
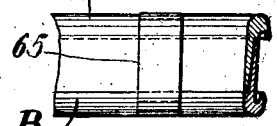
INVENTOR
John Henry Gildersleeve.
BY A. A. de Bonneville
ATTORNEY

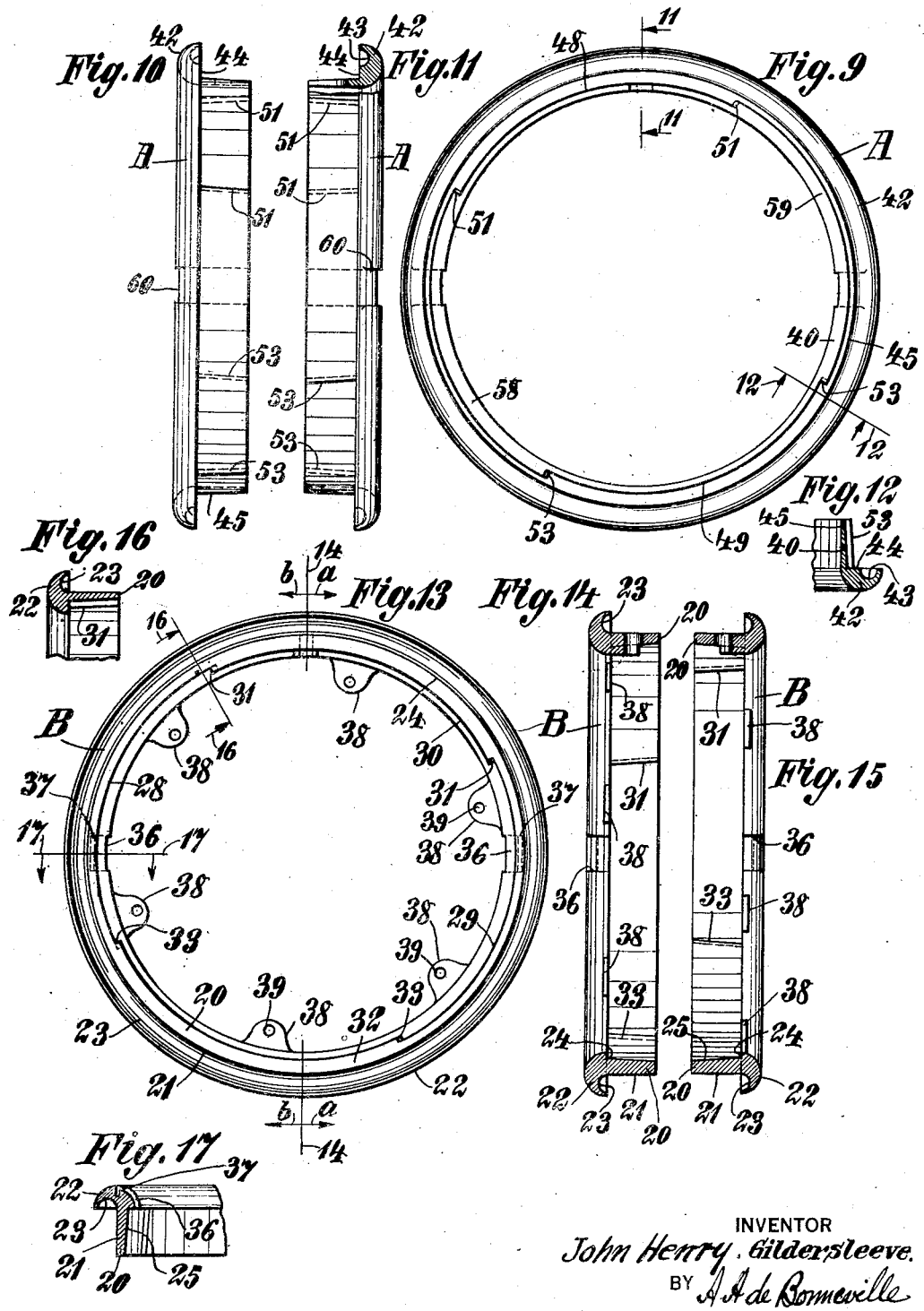

Patented Apr. 5, 1927.

1,623,834

UNITED STATES PATENT OFFICE.

JOHN HENRY GILDERSLEEVE, OF CORONA, NEW YORK.

DEMOUNTABLE INTERLOCKING RIM FOR VEHICLE TIRES.

Application filed August 15, 1924. Serial No. 732,328.

This invention relates to a demountable interlocking rim for vehicle tires.

The invention is applicable to tires with shoes having inner air of cushion tubes, and also to tires without inner tubes.

The object of the invention is the production of a demountable interlocking rim, to which a tire can be easily connected, without the necessity and annoyance of stretching it with tire irons or other tools, over the flanges of the ordinary stationary rim that is made of one piece of material. The second object of the invention is the production of a demountable interlocking rim, on which a tire can be seated without danger of pinching or injuring the inner tube thereof, by reason of contacting with joints of the members of the rim. The third object of the invention is the production of a demountable interlocking rim with members, which when interlocked will present a smooth uninterrupted cylindrical surface for the tire to be seated upon. The fourth object of the invention is the production of a demountable interlocking rim with members, that can be easily locked to each other or detached from each other, and which members when locked to each other will not creep one over the other but remain in fixed circumferential relation to each other. The fifth object of the invention is the production of a demountable interlocking rim having members that can be locked to each other when positioned for a spare wheel, or when being shipped. The sixth object is the production of a demountable interlocking rim that can be used with various styles of vehicle wheels, that is to say with wheels that employ detachable lugs for clamping their tires in place, on both sides of the felly of each wheel, wheels which require only detachable lugs on one side of the felly and wheels without detachable lugs.

The organization of the invention comprises a rim with a pair of annular demountable interlocking members, adapted to be superposed one over the other. Interlocking recesses and projections formed on the inner face of one member, can interlock with corresponding projections and recesses formed on the outer face of the other member.

In the accompanying drawings Fig. 1 represents an elevation of the members of the rim in operative position on a vehicle wheel. Fig. 2 shows a horizontal axial section of members of the rim; Fig. 3 shows a top plan view of the members of the rim; Fig. 4 shows a section of the members of the rim devoid of the tire as on the line 4, 4 of Fig. 1; Fig. 5 shows an enlarged perspective view of a fragmentary portion and section of Fig. 4 on the line 5, 5; Figs 6, 7 and 8 indicate enlarged fragmentary portions of Fig. 2 each with a slight modification; Fig. 9 shows an elevational view of one of the rim sections as seen from its inner side; Fig. 10 is an outside edge view of the section shown in Fig. 9; Fig. 11 is an edge view of Fig. 9 showing a section on the line 11. 11 thereof; Fig. 12 shows a section of Fig. 9 on the line 12, 12; Fig. 13 shows an interior elevation of the second portion of the interlocking rim; Fig. 14 is a section of Fig. 13 on the line 14, 14 viewed in the direction of the arrow $a$; Fig. 15 represents a section of Fig. 13 on the line 14, 14 viewed in the direction of the arrow $b$; Fig. 16 is a section of Fig. 13 on the line 16, 16 and Fig. 17 is a section of Fig. 13 on the line 17, 17.

Referring to Figs. 1 to 5 and 9 to 17 inclusive, the demountable interlocking rim comprises a pair of portions designated respectively in their entireties by the letters A and B.

The portion B comprises the outer annular member 20, having the outer smooth cylindrical surface 21 throughout its width and circumference. A curved flange 22 with the locking groove 23 and the inner stop shoulder 24 are formed with the member 20. The inner face 25 of the member 20 slightly tapers from the flange 22 to its other edge. From the said inner face 25 of the outer portion B are formed the annular interlocking recesses 28 and 29, each approximately a quadrant in extent. and which form the inwardly extending interlocking projection 30, having the ends 31 and the inwardly extending interlocking projection 32 having the ends 33. The projections 30 and 32 are each approximately a quadrant in extent.

In the outer face of the flange 22 are formed a pair of depressions 36 which each terminate in a locking cavity 37. Locking lugs 38 having the openings 39 extend from the flange 22 of the portion B.

The inner portion A of the interlocking rim comprises the annular member 40, having the outwardly extending curved flange 42, the locking groove 43 and the inner stop shoulder 44. The outer face 45 of the member 40 tapers slightly toward the inner portion of said member. With the said outer face 45 of the member 40 are formed the interlocking recesses 48 and 49, each approximately a quadrant in extent. The latter recesses are adapted to lock with the interlocking projections 30 and 32. The recesses 48 and 49 form the outwardly extending locking projections 58 and 59.

A pair of spring clamps 65 are each indicated with the hook end 66 and the handle end 67. The clamps 65 engage the flanges of the members 20 and 40. The hook ends 66 lock with the cavities 37, when the portions A and B of the rim are locked to each other and located in proper position as a spare rim.

The vehicle wheel (see Figs. 1 and 2) for the demountable interlocking rim is indicated with the hub 70, spokes 71 and the felly 72 having the opening 73. The stationary rim 75 of the felly is indicated with its usual flange 76.

The tire of the wheel is indicated with the shoe 78 having the open edge portions 79 and 80, the inner tube 81 and the air valve 82.

Bolts 85 extend through the felly 72 and through the openings 39 of the lugs 38.

To mount the tire and demountable interlocking rim in place, the portion A in this instance is first placed in position on the rim 75, with its flange 22 abutting against the flange 76. Next the bead 79 of the shoe 78 is engaged with the locking groove 23 of the flange 22, and the air valve 82 is extended through an opening in the rim 75 and the opening 73 of the felly 72. The portion B is now located upon the portion A, with the projections of one member interlocking with the recesses of the other. The bolts 85 are next located in position, and the portions A and B are drawn in place to secure the tire of the wheel in proper position.

In the modification indicated in Fig. 6, the portions of the demountable interlocking rim are again indicated in their entireties at A and B.

The portion B has formed on the outer face of its flange 22, the depressions 90.

The portion A is indicated with its flange 42. The spokes of the wheel are again shown at 71 with the felly 72. The stationary rim 75 is shown with its flange 76. The shoe is again shown at 78 with its inner tube 81.

A plurality of detachable clamping lugs 92, of which one is shown, have each a flange 93. The lugs 92 bear against a side face of the felly 72 and the flanges 93 engage the depressions 90. The bolts 85 clamp the lugs 92 in place and thereby the portions A and B are detachably locked in position.

In the modification indicated in Fig. 7 the portions of the demountable rim are again shown in their entireties by the letters A and B. The portion B is indicated with its flange 22 having a plurality of depressions 90, one of which is shown. The portion A is indicated with its flange 42 also having a plurality of depressions 90, one of which is shown. The spokes of the wheel are again indicated at 71, with the felly 72. The stationary rim 96 devoid of flanges is supported on said felly. A plurality of detachable clamping lugs 92, each with the flange 93 are provided. Only one of the lugs 92 is shown. The lugs 92 bear against the side faces of the felly 72 and the flanges 93 engage the depressions 90 in the flanges of the portions B and A. The bolts 85 clamp the lugs 92 in place and thereby the portions A and B are detachably locked in position.

In the modification shown in the Fig. 8 the portions of the demountable interlocking rim are indicated in their entireties at A and B. The portion A has formed therewith its flange 42 and the depressions 90. The portion B has formed therewith its flange 22 and the depressions 90. The spokes of the wheel are shown at 71, with the felly 72. The stationary rim is indicated at 96. The shoe is again shown at 78 with its inner tube 81. A plurality of pairs of detachable clamping lugs 90 are each connected to each other, by the connecting member 99, having the opening 100. A screw 101 extends through the opening 100 and engages the felly 72. The bolts 85 extend through the felly 72 and clamp the clamping lugs 98 to the flanges 22 and 42, to maintain the portions B and A in position. In this modification when the bolts 85 are detached from the felly 72, the clamping lugs 98 with the connecting members can be lowered. The screws 101 prevent the clamping members being completely detached from the felly.

Various modifications may be made in the invention and the present exemplification is to be taken as illustrative and not limitative thereof.

Having described my invention what I desire to secure by Letters Patent and claim is:

In a demountable rim for a vehicle wheel the combination of an inner annular member having a continuous inner smooth face of a width to extend across the full width of the felly of the wheel, a flange at one side of said inner annular member, interlocking projections each approximately comprising a quadrant of the said inner member integral with and extending from the outer face of the member and forming recesses between them, each recess approximately constituting a quadrant in the outer face of said inner member, an outer annular member for the demountable rim, a flange at one side of said outer member, oppositely positioned to the flange of the inner member, said outer member having a smooth outer face extending from its flange, to the flange of the inner member when in operative position therewith, said outer member adapted to be coaxially superposed over the inner member and projections integral with and extending from the inner face of said outer member, the latter projections each approximately comprising a quadrant of the member and forming recesses on the inner face of said outer member, the projections of each of said members adapted to lock with the recesses of the other member.

In testimony whereof I have affixed my signature this 1st day of July, 1924.

JOHN HENRY GILDERSLEEVE.